US006401123B1

(12) United States Patent
Shields et al.

(10) Patent No.: US 6,401,123 B1
(45) Date of Patent: Jun. 4, 2002

(54) SYSTEMS, METHODS AND COMPUTER PROGRAM PRODUCTS FOR EMPLOYING PRESUMPTIVE NEGOTIATION IN A DATA COMMUNICATIONS PROTOCOL

(75) Inventors: Ian Beaumont Shields; Peter Williams Volkmar, both of Raleigh, NC (US)

(73) Assignee: International Busines Machines Corporation, Armonk, NY (US)

( * ) Notice: Subject to any disclaimer, the term of this patent is extended or adjusted under 35 U.S.C. 154(b) by 0 days.

(21) Appl. No.: 09/198,381

(22) Filed: Nov. 24, 1998

(51) Int. Cl.[7] ............................................... G06F 15/16
(52) U.S. Cl. ....................................................... 709/227
(58) Field of Search ................................ 709/227, 228, 709/203, 234, 235

(56) References Cited

U.S. PATENT DOCUMENTS

| | | | | |
|---|---|---|---|---|
| 5,588,117 A | * | 12/1996 | Karp et al. | 395/200.03 |
| 5,931,913 A | * | 8/1999 | Meriwhether et al. | 709/227 |
| 6,061,714 A | * | 5/2000 | Housel, III et al. | 709/203 |

OTHER PUBLICATIONS

Rekhter, "Telnet 3270 Regime Option", RFC 1041, T.J. Watson Research Center, IBM, Jan. 1988.
Penner, "TN 3270 Current Practices", RFC 1576, DCA, Inc., Jan. 1994.
Postel et al., "Telnet Protocol Specification", RFC 854, ISI, May 1983.
Postel et al., "Telnet Option Specification", RFC 855, ISI, May 1983.

\* cited by examiner

*Primary Examiner*—John A. Follansbee
(74) *Attorney, Agent, or Firm*—Myers Bigel Sibley & Sajovec; Edward H. Duffield, Esq.

(57) ABSTRACT

Presumptive option negotiation is provided between a first entity and a second entity, each of which is operative to communicate according to a communications protocol including a plurality of negotiable options. A first information transfer from the first entity to the second entity is performed according to the communications protocol, the first information transfer including a message indicating support of an option and a message conforming to the option. A second information transfer from the second entity to the first entity it then performed according to the communications protocol, the second information transfer including a message indicating support of the option and a message responding to the message conforming to the option. The first information transfer may include transfer a message indicating support of a terminal type negotiation option and a message conforming to the terminal type negotiation option, and the second information transfer may include transfer of a message indicating support of the terminal type negotiation option and a message responding to the message conforming to the terminal type negotiation option. The communications protocol may include a Telnet or other option-negotiating protocol. Data communications systems, apparatus and computer program products for employing the above-described presumptive negotiation functions are also described.

25 Claims, 4 Drawing Sheets

SYSTEMS, METHODS AND COMPUTER PROGRAM PRODUCTS FOR EMPLOYING PRESUMPTIVE NEGOTIATION IN A DATA COMMUNICATIONS PROTOCOL

FIELD OF THE INVENTION

The present invention relates to data communications, in particular, to systems, methods and computer program products for implementing communications protocols.

BACKGROUND OF THE INVENTION

Traditional mainframe computer configurations typically provide for user interface to a host computer through computer terminals that are either directly connected to the host or connected to the host by relatively high speed networks. Examples of such a configurations include configurations that provide IBM 3270 and IBM 5250 terminal access to host applications executing on a mainframe computer using a Telnet protocol.

As computing and communications technology has evolved, however, the connections between network devices have become more widely distributed. For example, modem networks may be distributed over wide geographic areas, such as the global Internet. Point-to-point communications in such a far-flung network may be routed through a multitude of networks, subnetworks and devices, and thus can be significantly delayed. In addition, some modem networks may include low bandwidth elements, such as wireless links, that may also introduce significant delays. These delays can be particularly disadvantageous for host/terminal applications.

Notwithstanding the expansion of networks, host/terminal applications still play a significant role. For example, legacy mainframe applications may be tied to more advanced distributed networks, with devices such as personal computers accessing the mainframe applications using, for example, terminal emulators. These terminal emulators typically use the original structured protocols of the host applications, such as the Telnet protocol.

Although host applications can be adapted to use a more state-of-the art communications infrastructure, the performance of a host application may be hampered by delays introduced by far flung network routing and lower bandwidth channels such as wireless links. For this reason, among others, conventional procedures for communicating between terminals and hosts may be disadvantageous. However, because of the large installed base of conventional host applications and terminals designed for using these applications, it may be cost ineffective or infeasible to extensively modify these existing applications to incorporate more efficient communications techniques suited to these environments.

For example, a Telnet logon protocol for connecting a 3270 or 5250 terminal (or terminal emulator) to a host application includes several information transfers between the terminal and the host in order to establish a session. As illustrated in FIG. 1, a Telnet session is initiated by a host 110 sending a "DO TT" terminal type option message to a terminal 120, indicating that the host 110 desires to begin terminal type negotiation. In response, the terminal 120 sends a "WILL TT" terminal type option message to the host 110, indicating that the terminal 120 supports terminal type negotiation. The host 110 then sends a "SEND TT" message (SB and SE represent subnegotiation delimiters), representing a request for the terminal 120 to send its terminal type, e.g., a value indicating whether the terminal 120 is a 3270, 5250, or other type of supported terminal. In response, the terminal 120 sends a "TT_IStype" message including the appropriate terminal type. The host 110 responds with a transfer including "DO EOR, WILL EOR, DO BIN, WILL BIN" messages, requesting the terminal 120 to engage Telnet end of record and binary transmission options. The terminal 120 responds by sending a transfer including "WILL EOR, DO EOR, WILL BIN, DO BIN" messages indicating support for the requested options. The host 110 then repeats the "DO BIN WILL BIN" messages, and data flows between the terminal 120 and the host 110.

The Telnet logon procedure illustrated in FIG. 1 involves eight individual transfers. In a lower bandwidth environment, such as an internet or wireless environment, this number of transfers can incur significant delays as the various options are negotiated. This can severely impact the performance of a Telnet application, especially an application involving frequent connection and disconnection of the terminal and host.

Conventional techniques for addressing this performance problem include using a disconnect function that allows a user to disconnect from a Systems Network Architecture (SNA) application for a period of time and reconnect at the same point in the application at which the user disconnected, thus potentially reducing the overhead associated with reconnecting to the application. Similarly, a short hold mode has been implemented in SNA applications which allows a physical link, such as an X.25 modem, to be shut down during periods of no traffic in an SNA session without taking down the overlying SNA session. Unfortunately, however, these approaches typically involve significant modification of the SNA application, and may still produce less than desired levels of performance. Another approach described in U.S. patent application Ser. No. 08/852,461, assigned to the assignee of the present invention, utilizes proxies connected between the terminal and the host and communicating using a private protocol to reduce communications overhead.

SUMMARY OF THE INVENTION

In light of the foregoing, it is an object of the present invention to provide improved communications using option-negotiating protocols such as Telnet.

It is another object of the present invention to provide improved host/terminal communications in bandwidth limited environment.

It is yet another object of the present invention to provide improved host/terminal communications with minimal modification of existing hardware and/or software.

These and other objects, features and advantages are provided according to the present invention by data communications systems, methods and computer program products in which presumptive negotiation is performed between first and second entities that communicate using a communications protocol, based on a priori knowledge of options supported by the entities. In this manner, the number of information transfers required, for example, to initiate a host/terminal session, can be reduced. In bandwidth-limited environments, such as in an internet or a wireless data communications systems, this reduction in data transfers can result in significantly improved performance.

In particular, according to the present invention, presumptive negotiation is provided between a first entity and a second entity in a data communications network, each of which is operative to communicate according to a communications protocol including a plurality of negotiable options. A first information transfer from the first entity to the second entity is performed according to the communications protocol, the first information transfer including a message indicating support of an option and a message conforming to the option. A second information transfer from the second entity to the first entity is then responsively performed according to the communications protocol, the second information transfer including a message indicating support of the option and a message responding to the message conforming to the option. According to an embodiment of the present invention, the first information transfer includes transfer of a message indicating support of a terminal type negotiation option and a message conforming to the terminal type negotiation option, and the second information transfer includes transfer of a message indicating support of the terminal type negotiation option and a message responding to the message conforming to the terminal type negotiation option. The communications protocol may include a Telnet or other option-negotiating protocol.

According to an aspect of the present invention, the first information transfer includes transfer of a message requesting terminal type negotiation and a message requesting identification of a terminal type supported by the second entity, followed by a second information transfer including transfer of a message confirming terminal type negotiation and a message identifying a terminal type supported by the second entity. According to another aspect, the first information transfer includes transfer of a message indicating support of terminal type negotiation and a message identifying a terminal type supported by the first entity, and the second information transfer includes transfer of a message confirming terminal type negotiation and a message requesting identification of a terminal type supported by the first entity.

In yet another embodiment according to the present invention, the first and second information transfers occur via a first interceptor connected to a host and a second interceptor connected between the first interceptor and a terminal. The first information transfer may include transfer of information from the first interceptor to the second interceptor, and the second information transfer may include transfer of information from the second interceptor to the first. Option negotiation may occur between the terminal and the second interceptor responsive to the first information transfer; and option negotiation may occur between the host and the first interceptor responsive to the second information transfer.

According to another aspect of the present invention, a third information transfer between the first and second entities may follow the second information transfer, the third information transfer including data. The third information transfer may also include transfer of a combination of data and an option command between the first entity and the second entity, followed by processing of the transferred data at the second entity according to the transferred option command.

Data communications systems, apparatus and computer program products for employing the above-described presumptive negotiation functions are also described. Improved performance for bandwidth-limited applications such as wireless or internet data communications applications may thereby be provided.

DETAILED DESCRIPTION OF EMBODIMENTS

Figure 1:
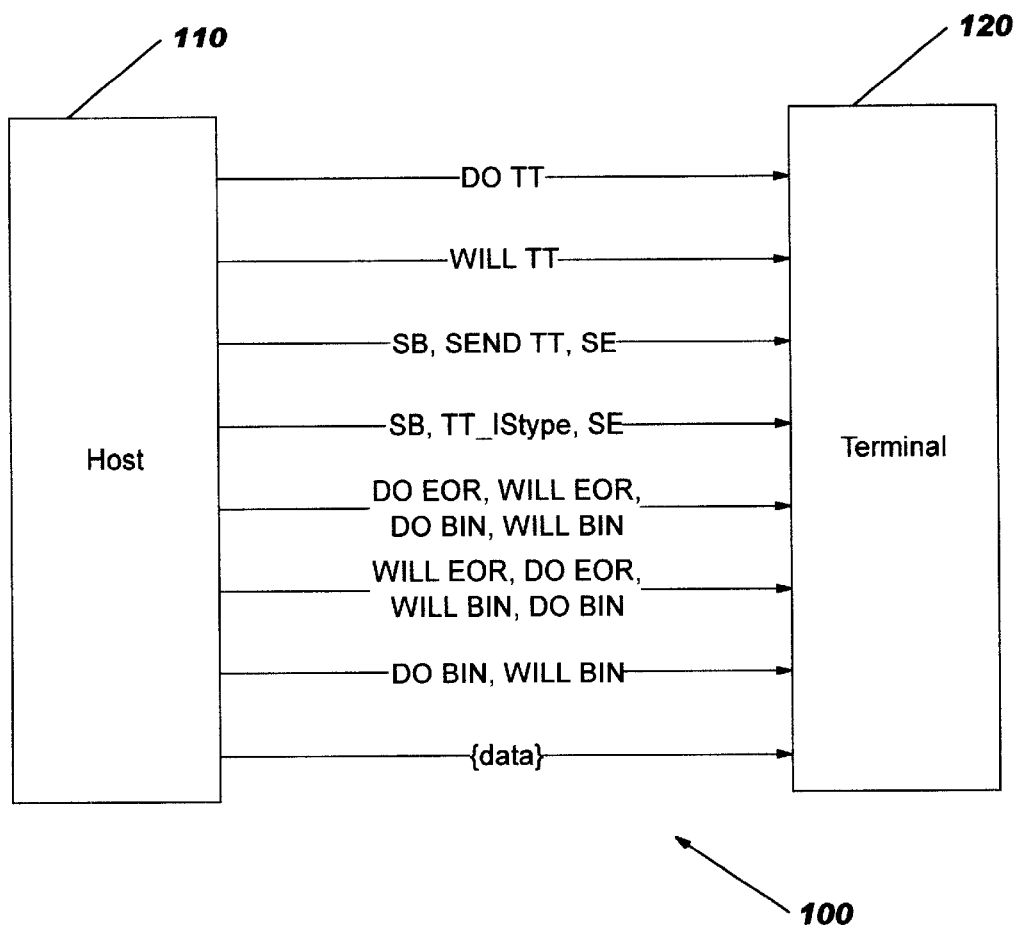
FIG. 1 illustrates a conventional Telnet negotiation.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as systems (apparatus), methods, or computer program products.

The discussion that follows specifically relates to exemplary Telnet applications as examples of presumptive negotiation in an "option negotiating" protocol, but those skilled in the art will appreciate that the apparatus, methods and computer program products of the present invention may also be applicable to "option-negotiating" protocols other than Telnet. As used herein, "option" refers to a specific capability under a data communications protocol which a particular network entity that uses the protocol, such as a host process, a terminal or the like, may or may not support. For example, Telnet applications often involve interfacing terminal devices and terminal oriented procedures (processes) to one another, but can also be used for terminal-to-terminal and process-to-process communications. As the components constituting these different interfaces may have different capabilities, the parameters under which such communications are conducted are established by the negotiation of options between entities (referred to as "Telnet hosts").

When a Telnet connection between entities is first established, each entity is assumed to include a "Network Virtual Terminal" (NVT), an imaginary device that corresponds to a canonical terminal. Each entity maps its device characteristics so as to appear as an NVT. However, because some entities may support, and desire to use, options (e.g., character modes, echoing, etc.) that may or may not be supported by other entities, Telnet provides for negotiation of these options, e.g., an option may be commanded (or queried) by one entity and confirmed by the other, allowing use of the options. The queries and confirmations are often implemented by a limited set of messages, i.e., "DO", "DON'T", "WILL", or "WON'T" followed by a particular option code. Some options may further involve so-called "subnegotiation," wherein information beyond a simple option code is provided, such as a parameter that identifies a particular type of device (or set of device capabilities). Option negotiation messages may flurry back and forth between entities when a Telnet connection is first established, and may also be transferred during a session.

The present invention arises from the realization that the number of data transfers normally devoted to such option negotiation may be reduced based on a priori knowledge of the entities involved in a particular application. For example, in a host/terminal Telnet application, it can be presumed that the "terminal" entity, e.g., an actual physical terminal or a terminal emulator running on a computer such as a personal computer, supports terminal type negotiation. In some such applications, it may also be further presumed that the terminal entity supports such options as end-of-record (EOR) and binary transmission (BIN).

In some environments it may be unnecessary, and even wasteful, to engage in negotiation of these options. FIG. 2 illustrates an exemplary wireless data communications system 200, including a first entity, here shown as a host application 215 resident on a server computer 210 (for example, a mainframe computer, AS400 or other server, or any of a number or other types of computers), and a second entity, here shown as a terminal emulator 225 resident on a remote client 220 (for example, a laptop computer, pen-based computer, special purpose terminal or other device) connected to the server 210 via a wireless link 245 routed, for example, through a cellular base station 240. To perform the terminal type and transmission option negotiation between the emulator 225 and the host application 215 over the wireless link 245 using the flows of FIG. 1 could lead to significant delays, perhaps on the order of several seconds.

Figure 2:
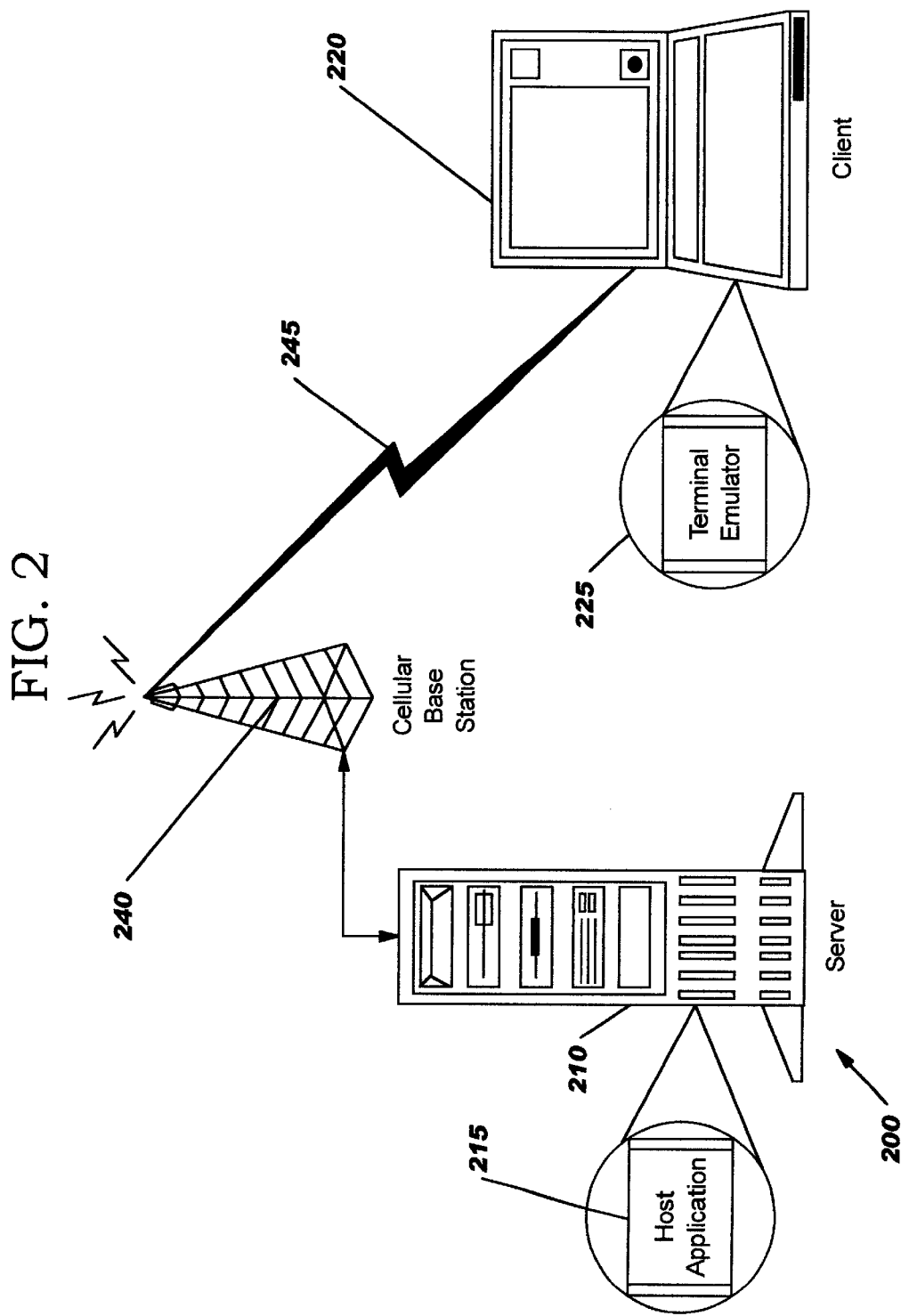
FIG. 2 illustrates a data communications system in which the apparatus and methods of the present invention may be practiced.
Figure 3:
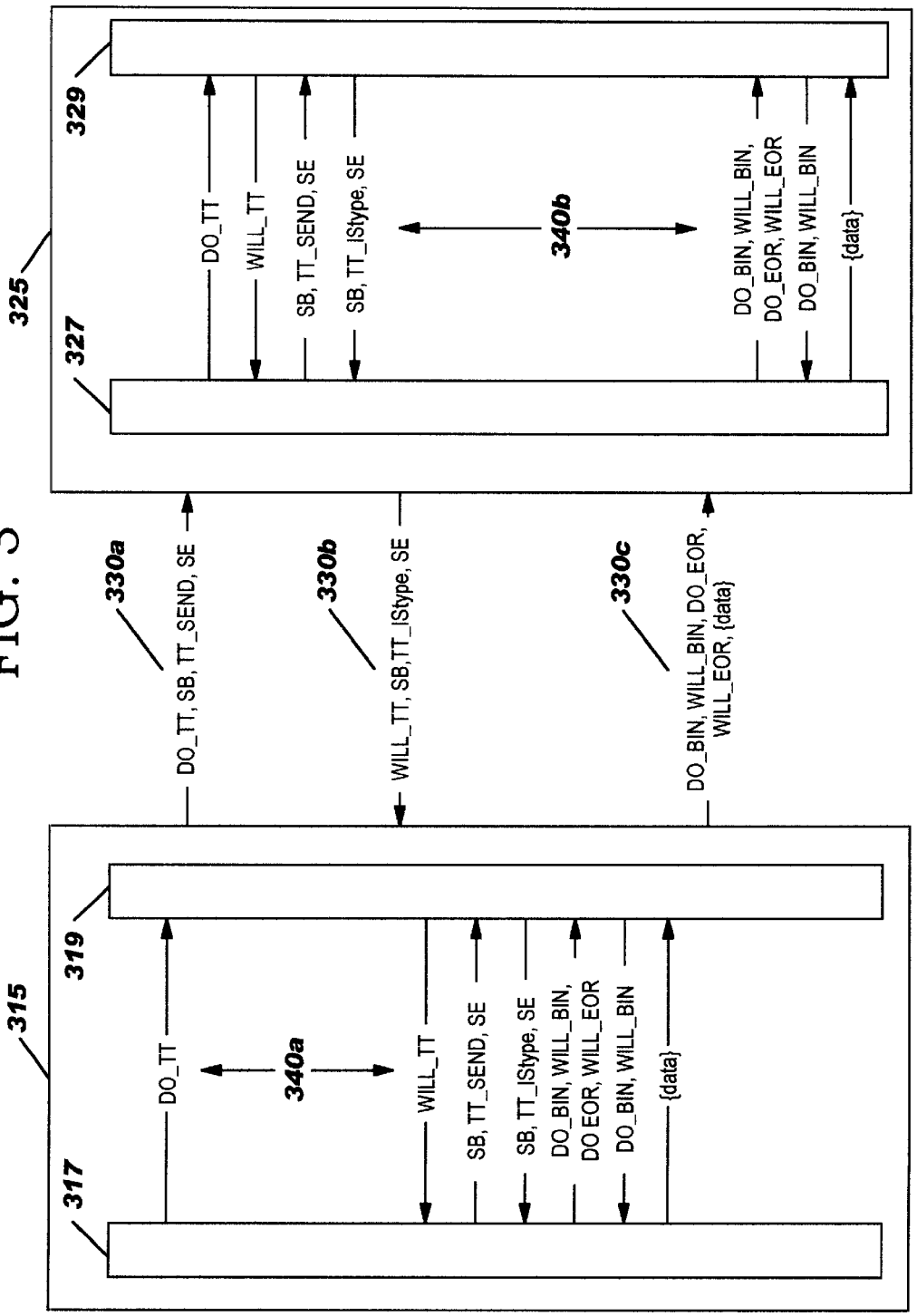
FIG. 3 illustrates presumptive negotiation according to an embodiment of the present invention.

However, as illustrated in FIG. 3, the eight information transfers of the original terminal type negotiation and transfer process of FIG. 1 may be reduced to three information transfers in a data communications system 200' according to a first embodiment of the present invention. A first information transfer 330a, including a concatenation of a terminal type negotiation request (DO_TT) and a terminal type subnegotiation message (TT_SEND), is performed between a first entity 315 and a second entity 325 according to a Telnet protocol. In response, the second entity 325 performs a second information transfer 330b, sending a concatenation of a message (WILL_TT) indicating support of terminal type negotiation and a subnegotiation message (TT_IStype) indicating a terminal type supported by the second entity 325. After the second information transfer 330b is received at the first entity 315, a third information transfer 330c is performed, including a concatenation of a binary transmission option request and confirmation (DO_BIN, WILL_BIN), an end of record transmission option request and confirmation (DO EOR, WILL_EOR), and data ({data}).

The first entity 315 of FIG. 3 may include, for example, a host application (such as the host application 215 of FIG. 2) that is capable of sending and receiving concatenated Telnet messages; in some cases, this may require modification of an existing Telnet application. Alternatively, the first entity may include a Telnet-compliant application 317 that communicates with an interceptor 319 using a conventional Telnet negotiation 340a, with the interceptor 319 communicating with the second entity 325 using presumptive negotiation as described above.

Similarly, the second entity 325 may include, for example, a terminal or terminal emulator (such as the terminal emulator 225 of FIG. 2) that is capable of sending and receiving concatenated Telnet messages. Some conventional terminal emulators (such as Window NT telnet, OS/2 Telnet, AIX TN3270$^\alpha$ and PCOM 5250 on OS/2) may be capable of buffering and parsing concatenated Telnet streams such as the first information transfer 330a illustrated in FIG. 3, but, in some cases, need for this capability may require modification of an existing Telnet terminal or terminal emulator. Alternatively, the second entity may include a Telnet-compliant terminal or terminal emulator 329 that communicates with an interceptor (or proxy) 327 using a conventional Telnet negotiation 340b, with the interceptor 327 communicating with the first entity 315 using presumptive negotiation as described above.

Figure 4:
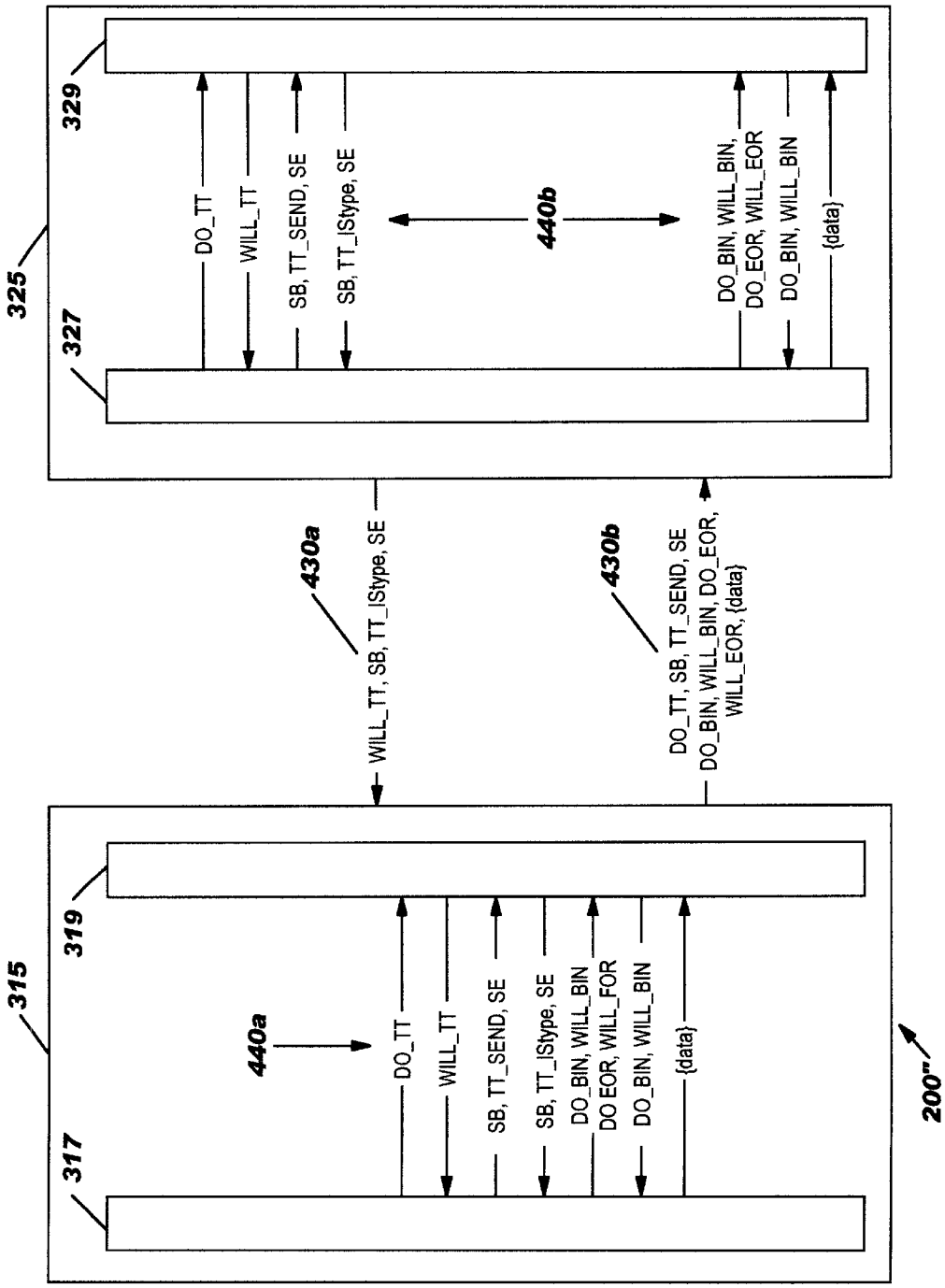
FIG. 4 illustrates presumptive negotiation according to another embodiment of the present invention.

In a communications system 200" according to a second embodiment of the present invention illustrate in FIG. 4, terminal negotiation and data transfer between first and second entities 315, 325 is reduced to two flows 430a, 430b. A first information transfer 430a, including transfer of a concatenation of a terminal type option confirmation (WILL_TT) and a subnegotiation message (TT_IStype) indicating a terminal type supported by the second entity 325, is performed between the second entity 325 and the first entity 315 according to a Telnet protocol. In response, the first entity 315 performs a second information transfer 430b, sending a concatenation of a terminal type option confirmation (DO_TT), a terminal type subnegotiation message (TT_SEND), a binary transmission option request and confirmation (DO_BIN, WILL_BIN), an end of record transmission option request and confirmation (DO EOR, WILL_EOR), and data ({data}). As with the data communications system 200' of FIG. 3, the first and second entities 315, 325 may directly perform presumptive negotiation, or may presumptively negotiate via first and second interceptors 319, 327 communicating with respective Telnet-compliant applications and terminals 317, 329 using conventional Telnet negotiations 440a, 440b.

Those skilled in the art will appreciate that FIGS. 3 and 4 illustrate operations for presumptive negotiation using an option negotiating protocol, as well as apparatus for performing such operations. It will be appreciated that the apparatus and operations illustrated in FIGS. 3 and 4 may be implemented, for example, using components of the data communications system 200 illustrated in FIG. 2. For example, the first entity 315 of FIGS. 3 and 4 may be positioned at the server 210 of FIG. 2, while the second entity 325 of FIGS. 3 and 4 may be positioned at the client 220 of FIG. 2, such that the presumptive Telnet negotiation illustrated in FIGS. 3 and 4 is performed over the wireless communications link 245 of FIG. 2. In this manner, improved data communications over the wireless communications link 245 may be achieved in comparison to use of conventional negotiation. Those skilled in the art will appreciate that although the present invention may be of beneficially used in wireless data communications applications, it may also be beneficially used in other bandwidth-limited applications, such as in Internet-based communications applications. It will also be understood that the operations of FIGS. 3 and 4 may be implemented by computer program instructions. These computed program instructions may be stored in a computer readable storage medium, e.g., a disk, tape, memory or the like, that can direct a computer or other programmable apparatus to function in a particular manner, such that the instructions stored in the computer readable medium produce an article of manufacture including instruction means which implement the operations of FIGS. 3 and 4. Accordingly, FIGS. 3 and 4 support methods, apparatus (systems) and computer program products.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating between a first entity and a second entity in a data communications network, the first and second entities operative to communicate according to a communications protocol comprising a plurality of negotiable options, the method comprising the steps of:

performing a first information transfer from the first entity to the second entity according to the communications protocol, the first information transfer including a message indicating support of an option and a message conforming to the option; and then performing a second information transfer from the second entity to the first entity according to the communications protocol, the second information transfer including a message indicating support of the option and a message responding to the message conforming to the option.

2. A method according to claim 1:

wherein said step of performing a first information transfer comprises the step of transferring a message indicating support of a terminal type negotiation option and a message conforming to the terminal type negotiation option;

wherein said step of performing a second information transfer comprises the step of transferring a message indicating support of the terminal type negotiation option and a message responding to the message conforming to the terminal type negotiation option.

3. A method according to claim 2, wherein the communications protocol comprises a Telnet protocol.

4. A method according to claim 2:

wherein said step of performing a first information transfer comprises the step of transferring a message requesting terminal type negotiation and a message requesting identification of a terminal type supported by the second entity; and wherein said step of performing a second information transfer comprises the step of transferring a message confirming terminal type negotiation and a message identifying a terminal type supported by the second entity.

5. A method according to claim 4:

wherein said step of performing a first information transfer comprises the step of transferring a message indicating support of terminal type negotiation and a message identifying a terminal type supported by the first entity; and wherein said step of performing a second information transfer comprises the step of transferring a message confirming terminal type negotiation and a message requesting identification of a terminal type supported by the first entity.

6. A method according to claim 2, wherein said step of performing a second information transfer is followed by the step of performing a third information transferring including data between the first entity and the second entity responsive to the second information transfer.

7. A method according to claim 6:

wherein said step of performing a third information transfer comprises the step of transferring a combination of data and an option command between the first entity and the second entity responsive to the second information transfer; and wherein said step of performing a third information transfer is followed by processing the transferred data at the second entity according to the transferred option command.

8. A method according to claim 1, wherein the first and second information transfers occur via a first interceptor connected to a host application and a second interceptor connected between the first interceptor and a terminal.

9. A method according to claim 8:

wherein said step of performing a first information transfer comprises the step of transferring information from the first interceptor to the second interceptor; and wherein said step of performing a second information transfer comprises the step of transferring information from the second interceptor to the first interceptor;

and further comprising the steps of:

performing an option negotiation between the terminal and the second interceptor responsive to the first information transfer; and performing an option negotiation between the host application and the first interceptor responsive to the second information transfer.

10. A data communications system, comprising:

a first entity operative to transmit a first information stream according to a communications protocol including a plurality of negotiable options, the first information stream including a message indicating support of an option and a message conforming to the option; and a second entity coupled to the first entity and operative to receive the first information stream and to responsively transmit a second information stream according to the communications protocol, the second information stream including a message indicating support of the option and a message responding to the message conforming to the option.

11. A system according to claim 10:

wherein the first information stream includes a message indicating support of a terminal type negotiation option and a message conforming to the terminal type negotiation option; and wherein the second information stream includes a message indicating support of the terminal type negotiation option and a message responding to the message conforming to the terminal type negotiation option.

12. A system according to claim 11, wherein the communications protocol comprises a Telnet protocol.

13. A system according to claim 11:

wherein the first information stream includes a message requesting terminal type negotiation and a message requesting identification of a terminal type supported by the second entity; and wherein the second information stream includes a second information stream including a message confirming terminal type negotiation and a message identifying a terminal type supported by the second entity.

14. A system according to claim 13:

wherein the first information stream includes a message indicating support of terminal type negotiation and a message identifying a terminal type supported by the first entity; and wherein the second information stream includes a message confirming terminal type negotiation and a message requesting identification of a terminal type supported by the first entity.

15. A system according to claim 11, wherein said first entity is operative to receive the second information stream and to responsively communicate data with the second entity.

16. A data communications apparatus, comprising:

means for receiving a first information stream according to a communications protocol including a plurality of negotiable options, the first information stream including a message indicating support of an option and a message conforming to the option, for receiving; and means, responsive to said means for receiving, for responsively transmitting a second information stream according to the communications protocol, the second information stream including a message indicating support of the option and a message responding to the message conforming to the option.

17. An apparatus according to claim 16:

wherein the first information stream includes a message indicating support of a terminal type negotiation option and a message conforming to the terminal type negotiation option; and wherein the second information stream includes a message indicating support of the terminal type negotiation option and a message responding to the message conforming to the terminal type negotiation option.

18. An apparatus according to claim 17, wherein the communications protocol comprises a Telnet protocol.

19. An apparatus according to claim 17:

wherein the first information stream includes a message requesting terminal type negotiation and a message requesting identification of a terminal type supported by the apparatus; and wherein the second information stream includes a second information stream including a message confirming terminal type negotiation and a message identifying a terminal type supported by the apparatus.

20. An apparatus according to claim 17:

wherein the first information stream includes a message indicating support of terminal type negotiation and a message identifying a terminal type supported by a sending entity; and wherein the second information stream includes a message confirming terminal type negotiation and a message requesting identification of a terminal type supported by the sending entity.

21. A computer program product, comprising:

a computer-readable storage medium having computer-readable program code means embodied in said medium, said computer-readable program code means comprising:

first computer-readable program code means for receiving a first information stream according to a communications protocol including a plurality of negotiable options, the first information stream including a message indicating support of an option and a message conforming to the option, for receiving; and second computer-readable program code means, responsive to said first computer-readable program code means, for responsively transmitting a second information stream according to the communications protocol, the second information stream including a message indicating support of the option and a message responding to the message conforming to the option.

22. A computer program product according to claim 21:

wherein the first information stream includes a message indicating support of a terminal type negotiation option and a message conforming to the terminal type negotiation option; and wherein the second information stream includes a message indicating support of the terminal type negotiation option and a message responding to the message conforming to the terminal type negotiation option.

23. A computer program according to claim 22, wherein the communications protocol comprises a Telnet protocol.

24. A computer program product according to claim 22:

wherein the first information stream includes a message requesting terminal type negotiation and a message requesting identification of a terminal type supported by a network entity apparatus; and wherein the second information stream includes a second information stream including a message confirming terminal type negotiation and a message identifying a terminal type supported by the network entity.

25. A computer program product according to claim 22:

wherein the first information stream includes a message indicating support of terminal type negotiation and a message identifying a terminal type supported by a sending entity; and wherein the second information stream includes a message confirming terminal type negotiation and a message requesting identification of a terminal type supported by a sending entity.

* * * * *